(12) United States Patent
Shauh et al.

(10) Patent No.: US 11,645,642 B2
(45) Date of Patent: May 9, 2023

(54) MOBILE PAYMENT SYSTEM AND METHOD USING A MOBILE PAYMENT DEVICE WITHOUT AN INSTALLED APPLICATION

(71) Applicants: Jack Shauh, San Diego, CA (US); Andrew Vinh Banh, Irvine, CA (US)

(72) Inventors: Jack Shauh, San Diego, CA (US); Andrew Vinh Banh, Irvine, CA (US)

( * ) Notice: Subject to any disclaimer, the term of this patent is extended or adjusted under 35 U.S.C. 154(b) by 558 days.

(21) Appl. No.: 16/172,156

(22) Filed: Oct. 26, 2018

(65) Prior Publication Data
US 2019/0130384 A1 May 2, 2019

Related U.S. Application Data

(60) Provisional application No. 62/585,525, filed on Nov. 13, 2017, provisional application No. 62/577,685, filed on Oct. 26, 2017.

(51) Int. Cl.
*G06Q 20/32* (2012.01)
*G06Q 20/36* (2012.01)
*G06Q 20/40* (2012.01)

(52) U.S. Cl.
CPC ..... *G06Q 20/3226* (2013.01); *G06Q 20/3674* (2013.01); *G06Q 20/401* (2013.01)

(58) Field of Classification Search
CPC .......... G06Q 20/3226; G06Q 20/3222; G06Q 20/32; G06Q 20/30; G06Q 20/00; G06Q 20/20; G06Q 20/08; G06Q 20/3255; G06Q 20/325; G06Q 20/3674; G06Q 20/367; G06Q 20/36; G06Q 20/401; G06Q 20/40
See application file for complete search history.

(56) References Cited

U.S. PATENT DOCUMENTS

| | | | | |
|---|---|---|---|---|
| 2007/0233615 A1* | 10/2007 | Tumminaro | ............ | H04L 63/08 705/75 |
| 2010/0192210 A1* | 7/2010 | Purdy, Sr. | .......... | G06Q 20/1235 726/7 |
| 2013/0317923 A1* | 11/2013 | Capps | .................... | G06Q 20/12 705/16 |
| 2014/0351127 A1* | 11/2014 | Mcmullan | ............ | G06Q 20/385 705/44 |
| 2015/0095238 A1* | 4/2015 | Khan | ................... | G06Q 20/382 705/71 |
| 2017/0193475 A1* | 7/2017 | Mercilie | ............ | G06Q 20/3274 |

FOREIGN PATENT DOCUMENTS

WO    WO-2016206530 A1 * 12/2016   ............. G06Q 20/38

* cited by examiner

*Primary Examiner* — Namrata Boveja
*Assistant Examiner* — Divesh Patel
(74) *Attorney, Agent, or Firm* — Parsons & Goltry; Robert A. Parsons; Michael W. Goltry

(57) ABSTRACT

A mobile payment method includes the steps of providing a mobile payment device having mobile payment capability and a mobile identity. Providing transaction information for a transaction and sending the transaction information to a server. The server prepares a URL link containing the transaction information and sends the URL link to the mobile payment device using the mobile identity. Clicking on the URL link sets up a HTTPS session and program script and validation token are downloaded to the mobile device. The payment can then proceed.

16 Claims, 7 Drawing Sheets

MOBILE PAYMENT SYSTEM AND METHOD USING A MOBILE PAYMENT DEVICE WITHOUT AN INSTALLED APPLICATION

CROSS-REFERENCE TO RELATED APPLICATION

This application claims the benefit of U.S. Provisional Application No. 62/577,685, filed 26 Oct. 2017 U.S., and U.S. Provisional Application No. 62/585,525, filed 13 Nov. 2017.

FIELD OF THE INVENTION

This invention relates to mobile payment systems.

More particularly, the present invention relates to remote mobile payment for online purchases, bill payment and the like.

BACKGROUND OF THE INVENTION

In the payments industry, mobile payments systems are becoming more widely used. Mobile payment applications as a virtual credit/debit card are starting to be provided to mobile devices such as smart phones, tablets, watches and other wearable devices, and the like. Mobile payment methods currently include Apple Pay, Android Pay, Samsung Pay etc. As an example, a mobile device capable of mobile payment, can be used in a point of sale (POS) terminal to pay for a sale in a retailer store. Mobile payment can provide strong security to prevent fraud by implementing EMV (Europay, MasterCard and Visa) Integrated Circuit Card Specifications for Payment Systems. Furthermore, mobile payment can provide strong security by implementing EMV Payment Tokenization Specifications, or a vendor specific payment token scheme.

Turning now to FIG. 1, a payment system illustrating a previous solution is illustrated. Payment system 10 including a mobile payment device 12 and a PC 14 (web browsing capable device). Mobile payment device 12 is a device with computing capability and is embedded with a secure element or utilizes emulation software to emulate a secure element to securely store credit/debit card information, payment credentials, one-time credit/debit card number, payment token, digital currency, etc. Mobile payment device 12 can be a smart phone, a tablet, a wearable device (e.g. watch), or even a laptop computer, embedded with a secure element or utilizing emulation software to emulate a secure element, that stores credit/debit card, payment credentials, one-time credit/debit card number, payment token, digital currency, etc. Currently mobile payment platforms include Apple Pay, Android Pay, Samsung Pay and the like. PC 14 can be any browser capable device such as a desktop computer, a laptop computer, a tablet computer, mobile phone (or smart phone), self-checkout kiosk, etc. to browse products of the online store. In this case, PC 14 is either incapable of mobile payment, or mobile payment is undesirable from that specific device. System 10 enables a secondary device, in this case mobile payment device 12 to pay for online purchases at online store 16 made from PC 14. It will be understood that the term online refers to communication through a world wide web such as the Internet 15, a global communications network. Many users prefer to browse on a larger device such as a desk-top computer, a lap-top computer, a tablet computer, and the like, because a larger viewing area is provided. Unfortunately, mobile payment is not available on many of these systems. System 10 allows browsing on PC 14 while facilitating payment with a mobile payment device 12.

To allow communication with mobile device 12, thereby providing payment, a server 17 is provided to couple PC 14 to mobile device 12. Processing server 17 can be owned by the merchant or a third party company. During the purchase process, a customer uses PC 14 to "check out" on the merchant web site and receives payment information from online store 16 through an interface A. PC 14 switches the browser context to processing server 17, and forwards the mobile identity, e.g. mobile phone number, and payment information to processing server 17 via an interface B. The payment information can include transaction amount, currency code, and merchant identity, etc. Processing server 17 then relays the payment information to mobile device 12 with mobile payment capability, using the mobile identity, to a mobile application installed on the mobile device via an interface C. As will be understood, interfaces A, B, and C can be wireless or wireline connections through a network (Internet 15) such as the world wide web. In addition, the connection for interface A can be initiated by the browser of PC 14, and the connection for interface B can be initiated by the browser of PC 14 as well. A mobile application installed on mobile device 12 can interact with a mobile wallet of mobile device 12 to get a payment token and send encrypted payment data to processing server 17. The encrypted payment data can include payment token (i.e. substituted credit or debit card number in order to avoid leak of the real card number), transaction amount, currency code, cryptogram of card transaction verification, etc. Mobile device 12 communicates with server 17 via interface C, and then server 17 forwards the encrypted payment data and payment token to PC 14 via interface B. At this point, PC 14 is able to send the encrypted payment data and payment token to online store 16.

While effective, payment system 10 requires the customer to first download a mobile application to the mobile device. Such a process may slow down the adoption of the solution. Therefore, an application-less solution is desirable.

It would be highly advantageous, therefore, to remedy the foregoing and other deficiencies inherent in the prior art.

It is an object of the present invention to provide a remote mobile payment system which can be used without requiring an application to be installed on the mobile device.

SUMMARY OF THE INVENTION

Briefly, to achieve the desired objects and advantages of the instant invention, provided is a mobile payment method including the steps of providing a web browsing capable device, providing a mobile payment device having mobile payment capability and providing a server connectable to the web browsing capable device and the mobile payment device. The web browsing capable device is used in communication with the Internet to make an online purchase at an online store and receiving payment information. Transaction information is sent from one of the online merchant and the web browsing capable device to the server. The server creates a URL link including the transaction information and sends the URL link to the mobile payment device using the mobile identity. The URL link is clicked on with the mobile payment device to set up a HTTPS session between the mobile payment device and one of the server and the online merchant. A program script and validation token is downloaded to the mobile payment device from the one of the server and the online merchant in the HTTPS session. A token indication from the mobile device is sent to one of the server and the online merchant, and one of the server and the online merchant authorizes the transaction with a payment network.

Also provided is a mobile payment system including a server receiving transaction information. The server includes a URL link generator for creating a URL link including the transaction information. A mobile payment device having a mobile payment capability, receives the URL link with the transaction information and establishes a HTTPS session using the URL link. Program script and validation token are downloaded to the mobile payment device in the HTTPS session. The program script establishes a payment protocol with the payment capability of the mobile payment device.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
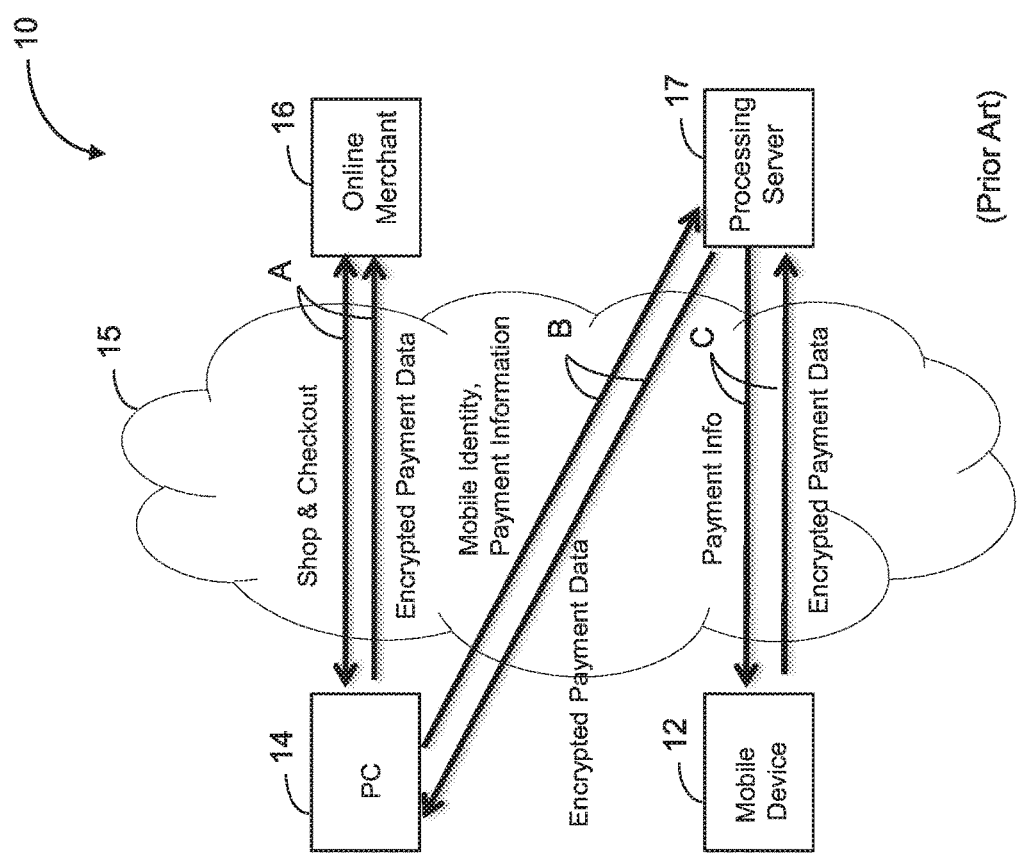
FIG. 1 is simplified block diagram of a payment system.
Figure 2:
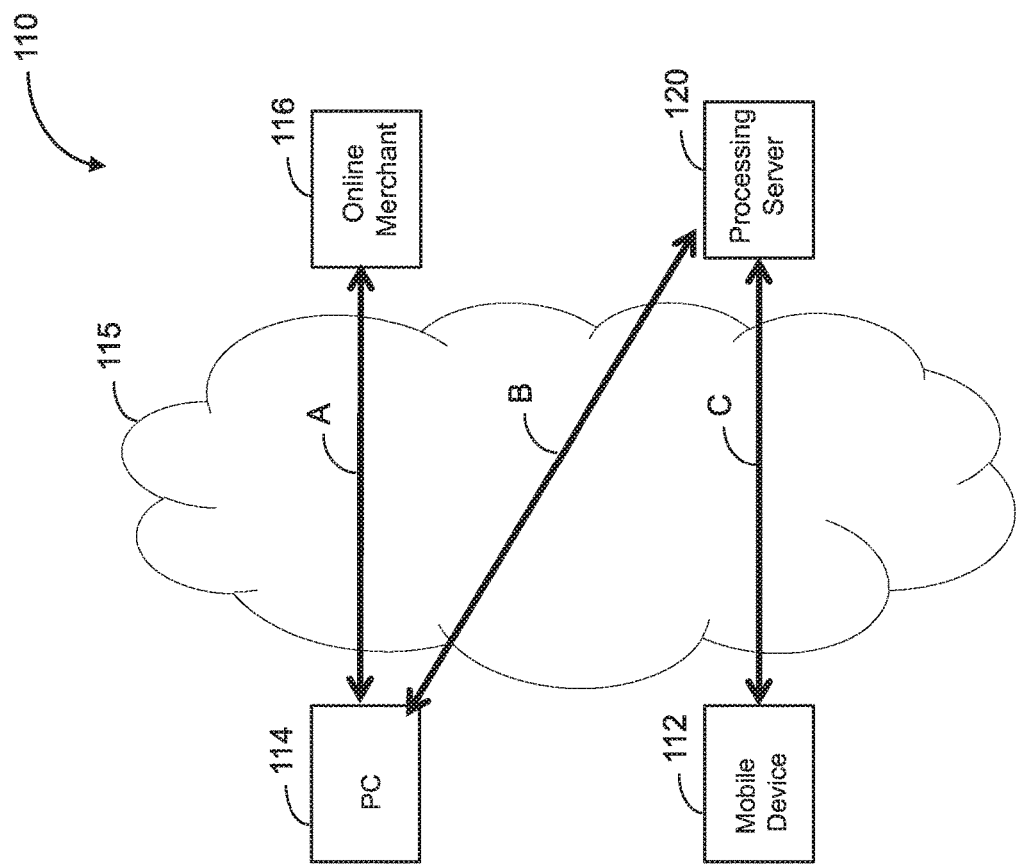
FIG. 2 is a simplified block diagram of a payment system according to the present invention.

Turning now to the drawings in which like reference characters indicate corresponding elements throughout the several views, attention is first directed to FIG. 2 which illustrates a payment system 110 according to the present invention. Payment system 110 includes a mobile payment device 112 and a PC 114 (web browsing capable device). Mobile payment device 112 is a device with computing capability and is embedded with a secure element or utilizes emulation software to emulate a secure element to securely store credit/debit card information, payment credentials, one-time credit/debit card number, payment token, digital currency, etc. Mobile payment device 112 can be a smart phone, a tablet, a wearable device (e.g. watch), or even a laptop computer, embedded with a secure element or utilizing emulation software to emulate a secure element, that stores credit/debit card, payment credentials, one-time credit/debit card number, payment token, digital currency, etc. Currently mobile payment platforms include Apple Pay, Android Pay, Samsung Pay and the like. PC 114 can be any browser capable device such as a desktop computer, a laptop computer, a tablet computer, mobile phone (or smart phone), self-checkout kiosk, etc. to browse products of the online store. In this case, PC 114 is either incapable of mobile payment, or mobile payment is undesirable from that specific device. System 110 enables a secondary device, in this case mobile payment device 112 to pay for online purchases at online store 116 made from PC 114, or as will be described presently, online bill payment. It will be understood that the term online refers to communication through a world wide web such as the Internet 115, a global communications network. Many users prefer to browse on a larger device such as a desk-top computer, a lap-top computer, a tablet computer, and the like, because a larger viewing area is provided. Unfortunately, mobile payment is not available on many of these systems. System 110 allows browsing on PC 114 while facilitating payment with a mobile payment device 112.

To allow communication with mobile device 112, thereby providing payment, a processing server 120 is provided to couple PC 114 to mobile device 112. Processing server 120 provides the essential difference between system 10 and system 110. Namely, processing server 120 creates a URL for purposes which will be described presently. Processing server 120 can be provided by the merchant or a third party company. During the purchase process, a customer uses PC 114 to "check out" on the merchant web site and receives payment information from online store 116 through an interface A. PC 114 switches the browser context to processing server 120, and forwards the mobile identity, e.g. mobile phone number, email accessible by mobile device 112 and the like, and payment information to processing server 120 via an interface B. The payment information can include transaction amount, currency code, and merchant identity, etc. Processing server 120 then relays the payment information to mobile device 112 with mobile payment capability, using the mobile identity, in the form of a URL, as will be described presently, via an interface C. As will be understood, interfaces A, B, and C can be wireless or wireline connections through a network (Internet 115) such as the world wide web.

Figure 3:
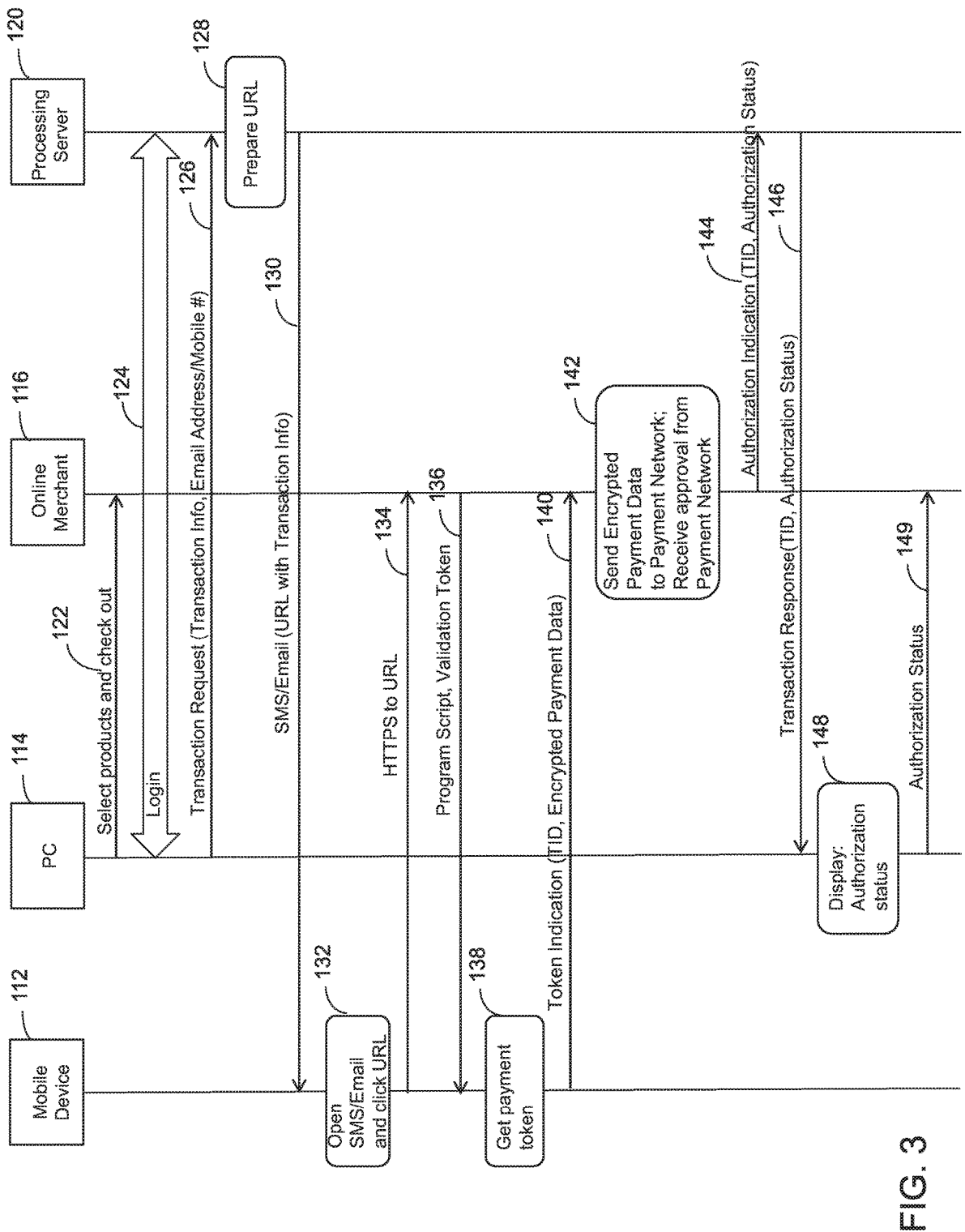
FIG. 3 is a schematic of a message exchange between elements of the payment system according to the present invention.

Turning now to FIG. 3, an example of the method steps for a mobile payment using system 110 is illustrated. The customer shops using PC 114 and checks out on the merchant website of online merchant 116. The customer chooses to select the use of a new payment method according to the present invention using system 110 and receives transaction information 122. The browser context of PC 114 switches to connect to processing server 120. The customer may be required to perform login procedure 124 with processing server 120, if not performed earlier with the merchant in the previous step. For example, the customer may provide a user name or password or answer a security question to verify. Or the customer can perform a login procedure via a well-known web server, e.g. Gmail, Facebook, to verify. Or there may be a HTTPS cookie at PC 114 to track the customer in previous login, and the current login procedure can be skipped. In login 124, the customer may need to provide a mobile identity, for example the mobile number of mobile device 112 or an email address accessible by mobile device 112, unless the merchant can get that information from a profile after user login to merchant's account. PC 112, having already received transaction information from online merchant 116, sends a transaction request 126 to processing server 120. The transaction request includes transaction information, e.g. transaction identity (TID), payment information (e.g. transaction amount, currency code, merchant identity, supported payment networks (brands), etc.), and message signature, and mobile number or email address which can be provided in the login procedure or profile of the customer account. Processing server 120 prepares a URL (Uniform Resource Locator) link 128 that preferably include transaction information, e.g. transaction identity (TID), payment information (e.g. transaction amount, currency code, merchant identity, supported payment networks (brands), etc.) and message signature to protect the integrity of the transaction information. Processing server 120 sends the URL (Uniform Resource Locator) link 130 in SMS to the mobile number or in email to the email address previously supplied. The customer receives the SMS on mobile device 112 and clicks the URL link 132. Alternatively, the customer receives an email, opens the email on mobile device 112 with mobile payment, and clicks the URL link contained therein. Mobile device 112 then sets up a HTTPS session 134 with online 112 merchant by using the URL link which preferably includes transaction information. The merchant may need to request a validation token from the mobile wallet provider (e.g. Apple) to allow the mobile browser to interact with the mobile payment core to generate the encrypted payment data for each payment transaction. Merchant 116 downloads a program script and validation token 136 to mobile device 112. With transaction information embedded in the URL, the program script can retrieve the payment related information. Mobile device 112 displays some payment information, e.g. transaction amount, merchant name (which can be derived from merchant identity; otherwise merchant name can be sent as part of URL) and etc., and prompt the customer to authorize. The customer is required to authorize the payment using biometric input, e.g. fingerprint, facial recognition, or iris scan. The program script interacts with the mobile payment core of the mobile device to generate the encrypted payment data 138. The encrypted payment data can include payment token (i.e. a surrogate for credit or debit card number), transaction amount, currency code, cryptogram of card transaction verification, etc. Then mobile device 112 sends token indication 140 to merchant 116. Token indication preferably includes encrypted payment data and transaction identity (TID). Merchant 116 receives the encrypted payment data and sends the encrypted payment data to the payment network 142 to approve the transaction. When merchant 116 receives an authorization response from the payment network, merchant 116 sends authorization indication 144 to processing server 120. The authorization indication can include transaction identity (TID) and authorization status (i.e. approval or reject). Processing server 120 sends 146 the transaction response to PC 114 by associating PC 114 with the transaction identity (TID). The transaction response includes authorization status and the transaction identity. PC 114 displays 148 authorization status to the customer. PC 114 may return 149 authorization status to merchant 116 although merchant 116 has already received the authorization status.

In the step of creating a URL 128 and sending an SMS or email containing the URL 130, the URL can include the URL address of merchant 116 and transaction information. For example:

www.xyz.com/pay.html?tid1=123456&tim=2017:09:18: 15:57&amt=49.99&cur=02&mid=xyz.com.wallet& &cap=07&sig=zndsepfae930and040ck83nokd0ns823

The information after is the transaction information, whose parameters are separated by "&". The parameter value starts with "parametername=". For example, the parameter names can include the following:

tid1: part of transaction identity
tim; transaction time yyyy:mm:dd:hh:mm. Note that tim appended with tid1 becomes a transaction identity, i.e. yyyy:mm:dd:hh:mm/nnnnnn amt: transaction amount
cur: currency code
mid: merchant identity, e.g. xyz.com.wallet (e.g. wallet can be a wallet provider name)
cap: supported network (brands), Bit 0: 'American Express'; Bit 1: 'Master Card'; Bit 2: 'Visa'
sig: signature on the hash of the URL content.

The signature is to verify that the URL was truly generated by processing server 120 and that the content of the URL has not been tampered with. In case of failure in verification, the merchant can decline the remaining procedures.

Depending on the mobile wallet API requirement, other parameter names and values can be added or changed in the URL. It will be understood that the URL may be too long to fit into one SMS text and segmentation of the URL into multiple SMS texts may be needed. This would, however, increase the probability of missing the URL (due to missing any one segmented SMS text) or increase the texting cost (due to multiple SMS texts). An alternative method described below can be used:

i. A small SMS trigger text with transaction Id (and other subset of transaction information, e.g. transaction amount, merchant identity and/or signature, may be included) can be sent first to the mobile device.

ii. Once user clicks on the SMS trigger text, which launches a HTTPS connection to processing server 120 or online merchant 116, process server 120 or online merchant 116 can send detail or remaining payment transaction information corresponding to transaction Id.

Additionally, the transaction identity (TID) has an explicit transaction time. Merchant 116 can use it to reject a transaction, provided that the transaction time in the TID is too old, e.g. one hour earlier than the current time. Alternatively, if the TID does not explicitly indicate a transaction time, the merchant can store the transaction time for TID associated with transaction request 126 in the database. Merchant 116 can query database to get the transaction time when HTTPS session 134 is set up.

Figure 4:
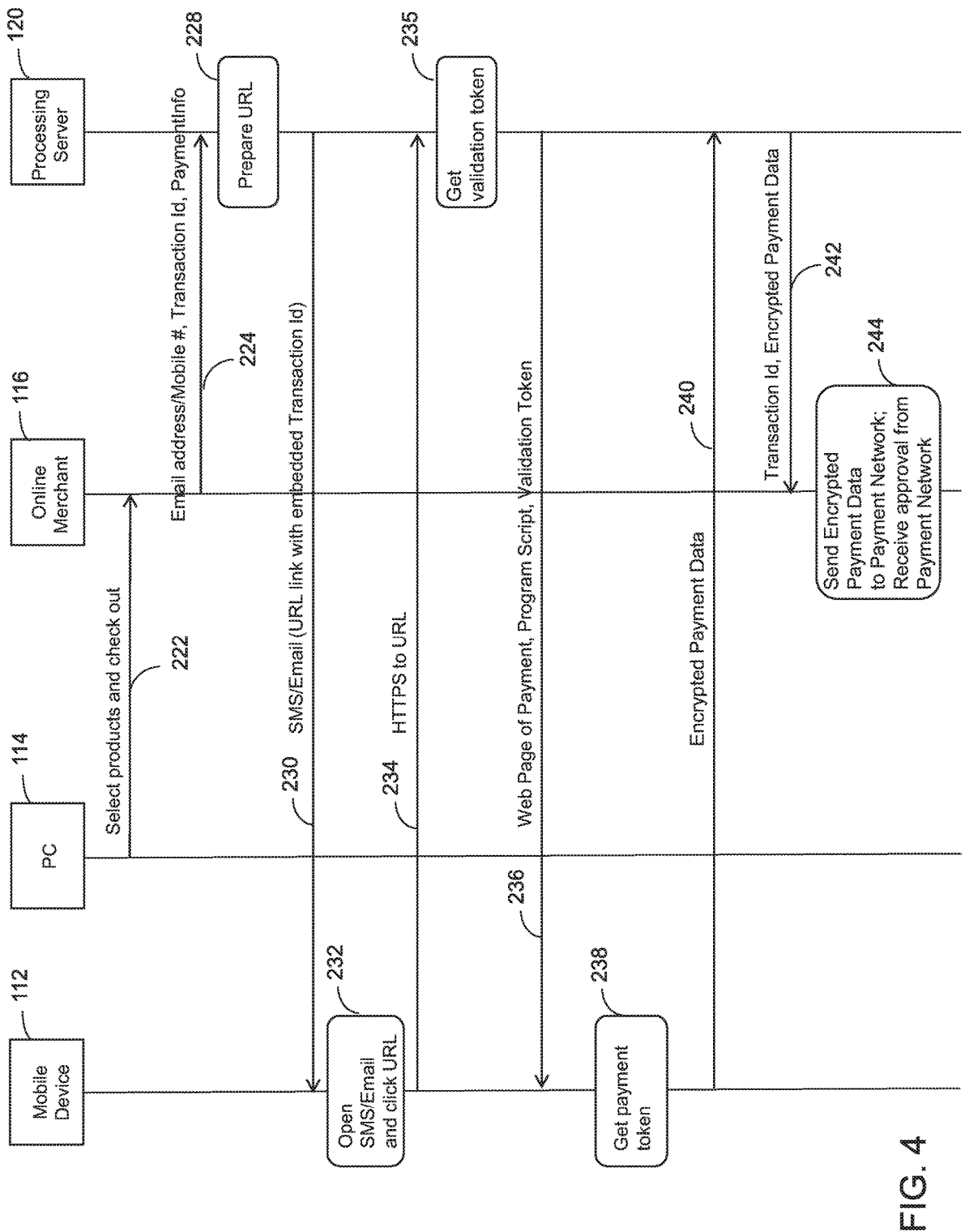
FIG. 4 is another schematic of the message exchange between elements of the payment system according to the present invention.

Referring now to FIG. 4, another example of method steps for a mobile payment using system 110 is illustrated. The customer shops using PC 114 and checks out 222 on the merchant website of online merchant 116. Merchant 116 forwards 224 the mobile phone number or email address of the customer, and transaction information to processing server 120. Transaction information can include transaction identity, and payment information. As will be seen in a later example, transaction information can also be referred to as "a bill" which is sent without requiring check out by a costumer. The payment information can include transaction amount, currency code, and merchant identity, etc. The transaction identity can associate with the payment information.

Processing server 120 prepares a URL (Uniform Resource Locator) 228 as described previously. Processing server 120 archives the payment information. Processing server 120 sends 230 SMS, i.e. text message, to mobile device 112, where the message contains this URL link. Alternatively, processing server 120 can send an email, where the message contains this URL link. The customer receives SMS on mobile device 112 and clicks 232 the URL link. Or the customer can receive email and open the email on mobile device 112, and click the URL link. Mobile device 112 then sets up 234 a HTTPS session with processing server 120 by using the URL link. Processing server 120 receives the HTTPS set up request from mobile device 112. To validate that a web payment session is originated from a valid merchant 116, merchant 116 can register with mobile wallet provider (e.g. Apple). Processing server 120 may need to request 235 a validation token from the mobile wallet provider to allow the mobile browser to interact with the mobile payment core to generate the encrypted payment data for each payment transaction. With transaction identity embedded in the URL, processing server 120 can retrieve the payment information corresponding to this particular transaction identity. Processing server 120 returns 236 a web page of payment using payment information associated with the transaction identity to mobile device 112, so that the customer can verify the information. The response also downloads a program script and validation token to get ready for the user to authorize this payment transaction. The program script interacts with the mobile payment core of mobile device 112 to generate the encrypted payment data 238. Before that, the customer is required to authorize the transaction using biometric input, e.g. fingerprint, facial recognition, or iris scan. The encrypted payment data can include payment token (i.e. surrogate for credit or debit card number), transaction amount, currency code, cryptogram of card transaction verification, etc. Then mobile device 112 can return 240 encrypted payment data and transaction identity to processing server 120. Merchant 116 receives 242 encrypted payment data and transaction identity from processing server 120 and sends 244 encrypted payment data to a payment network to approve the transaction.

Figure 5:
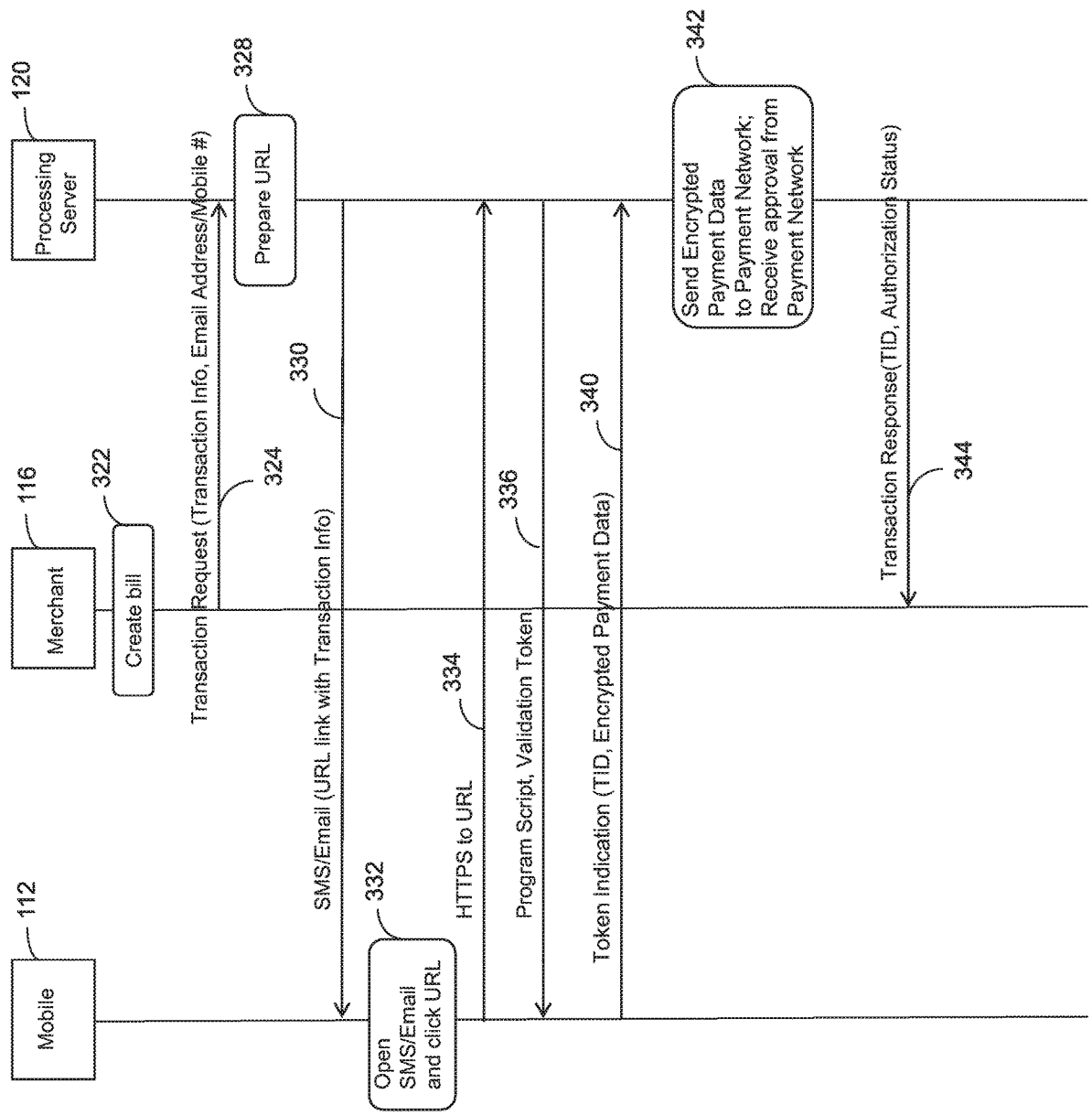
FIG. 5 is another schematic of the message exchange between elements of the payment system specifically related to bill payment.

Referring now to FIG. 5, another method is illustrated wherein the merchant requires the customer to pay a bill. For example, the bill can be from a hospital, apartment landlord, utility company, etc. It can be a one time or a recurrent bill. The customer can receive a SMS or email with the URL in order to use mobile payment to pay. Merchant 116 creates a bill 322, also identified as transaction information, and sends 324 a transaction request to processing server 120. The transaction request includes the transaction information (the bill), e.g. transaction identity (TID), payment information (transaction amount, currency code, merchant identity, supported networks (brands), etc.), and message signature (sig), and mobile number or email address which can be provided in the profile of the customer billing account. Processing server 120 prepares a URL (Uniform Resource Locator) 328 as described previously. Processing server 120 archives the payment information. Processing server 120 sends 330 SMS, i.e. text message, to mobile device 112, where the message contains this URL link. Alternatively, processing server 120 can send an email, where the message contains this URL link. The customer receives SMS on mobile device 112 and clicks 332 the URL link. Or the customer can receive email and open the email on mobile device 112, and click the URL link. Mobile device 112 then sets up 334 a HTTPS session with processing server 120 by using the URL link. Processing server 120 receives the HTTPS set up request from mobile device 112. Processing server 120 may need to request a validation token from the mobile wallet provider (e.g. Apple) to allow the mobile browser to interact with the mobile payment core to generate the encrypted payment data for each payment transaction. Processing server 120 downloads a program script and validation token 336 to mobile device 112. Then mobile device 112 sends 340 token indication to processing server 120, which can include encrypted payment data and transaction identity (TID). Processing server 120 receives encrypted payment data and sends 342 encrypted payment data to the payment network to approve the transaction. When processing server 120 receives the authorization response from the payment network, processing server 120 sends 344 a transaction response to merchant 116. The transaction response can include transaction identity (TID) and authorization status.

It will be understood by one skilled in the art that processing server 120 can be provided by the merchant or a third party company. If the processing server is owned by the merchant and uses the same server of the checkout, the processing server and the online merchant can merge to one entity, and the messages between the merchant and the processing server may not be needed in the procedures. Also, it will be understood that alternative messaging methods can be used to send URL link with transaction information, e.g. WhatsApp, Skype, LINE, Facebook messaging, etc. Furthermore, URL link can be encoded in the QR (Quick Response) code and be sent in the SMS, email or even paper bill. Mobile device 112 can launch camera to capture QR code and extract the URL link.

Figure 6:
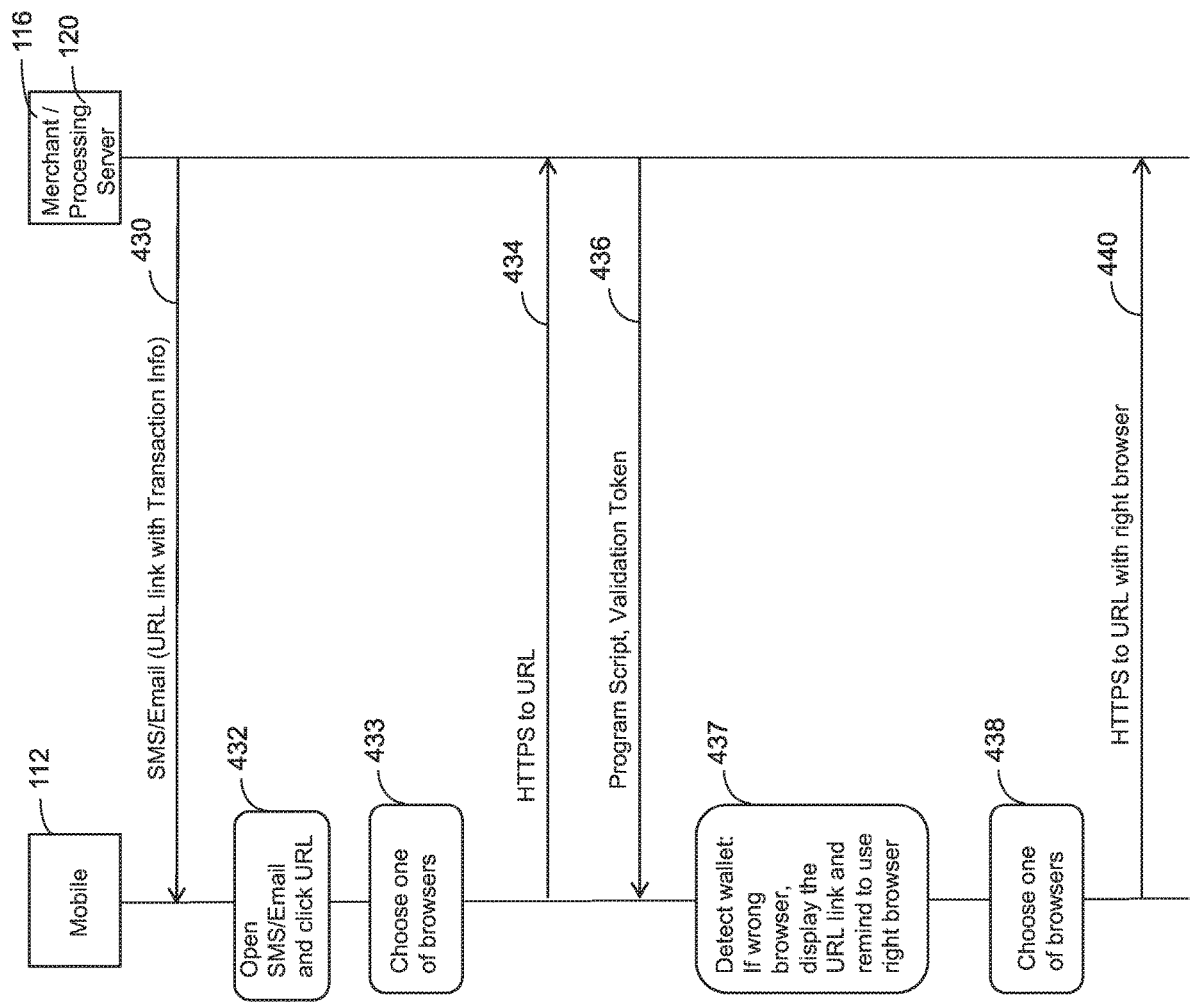
FIG. 6 is a schematic of the message exchange between elements of the payment system using a modified procedure for when a specific browser is required.

Turning now to FIG. 6, a modified procedure is illustrated for when a specific browser is required. In some instances, one wallet provider can only be used on a particular mobile browser. For example, wallet provider A can only use browser U and wallet provider B can only use browser V. So, the merchant or the processing server receiving the HTTPS request via a wrong browser should be able to handle the error in case the wrong browser is used. The previously described processes can be modified to ensure the proper browser be used. When mobile device 112 receives the SMS or email 430 from the merchant 116 or the processing server 120, the customer opens 432 the SMS or email on mobile device 112 with mobile payment. The message body of SMS and email contains the URL link with transaction information. In addition, it can remind the customer to use the appropriate browser: "For mobile wallet A, please select browser U after clicking the link; for mobile wallet B, please select browser V after clicking the link." The customer clicks the URL link. The customer will be asked to choose one of the browsers 433 installed on mobile device 112 and the customer chooses the correct browser. Mobile device 112 then sets up 434 a HTTPS session with merchant 116 by using the URL link via the browser selected. Processing server 120 downloads a program script and validation token 436 to mobile device 112. The program script downloaded can detect the native OS (such as iOS or Android) of mobile device 112 and determine 437 the mobile wallet type (for example: Apple Pay versus Android Pay), hence, it can remind the customer to use the correct browser. For example, if mobile wallet A is installed, it can remind please select browser U after clicking the link. The customer is asked 438 to choose one of the browsers installed in the mobile and the customer chooses the correct browser. Mobile device 112 can set up 440 a HTTPS session with the merchant by using the URL link via the browser selected. If the correct browser is selected, then the remaining procedure can continue as previously described.

Figure 7:
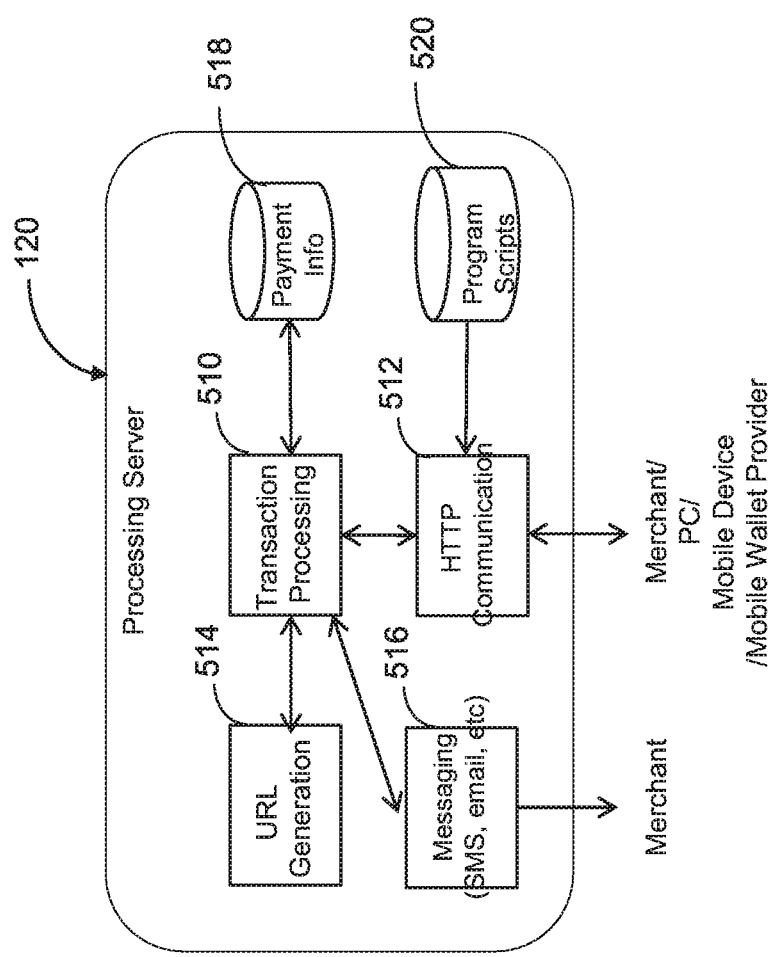
FIG. 7 is a simplified block diagram of the components of the processing server according to the present invention.

Referring now to FIG. 7, a simplified block diagram of functional modules of the processing server according to the present invention, such as FIGS. 4 and 5, is illustrated. For FIG. 3, some modules in FIG. 7 can be provided by the online merchant 116. Processing server 120, includes a transaction processing module 510. Transaction processor module 510 processes the messages, coordinates different components internal in processing server 120 and interacts with merchant 116, mobile device 112, PC 114 and the mobile wallet provider in each transaction. A HTTP Communication module 512 exchanges message with merchant 116 on the data, e.g. mobile identity, email address, transaction identity, payment information, encrypted payment data, etc. HTTP communication module 512 can exchange message with mobile device 112 on the data, e.g. payment information, encrypted payment data, etc., can exchange message with PC 114 on the data, e.g. mobile identity, email address, transaction identity, payment information, encrypted payment data, etc., and can request the mobile wallet provider for a session validation token to allow mobile browser to get the payment token. A URL Generation module 514 creates the URL with embedded transaction identity. A Messaging module 516 transmits the message to the mobile device using SMS with the given mobile phone number, email with the given email address or other messaging methods, e.g. WhatsApp, Skype, LINE, Facebook messaging, etc. A Payment Information database 518 archives payment information received from merchant 116 and associates it with transaction identity. A Program Scripts database 520 stores the program scripts to be downloaded and run in the mobile device 112 to interact with mobile payment core, etc.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:
1. A mobile payment method comprising the steps of:
providing a mobile payment device having mobile payment capability and a mobile identity;
providing transaction information for a transaction;
providing a server including a Uniform Resource Locator (URL) Generation module;
sending the transaction information to the URL Generation module of the server;
the URL Generation module of the server creating a URL link containing the transaction information, the transaction information including a transaction identity, a transaction amount, a currency code, a merchant identity, supported networks and a message signature;
the server sending the URL link to the mobile payment device using the mobile identity;
displaying the URL link by the mobile payment device;
a user clicking on the URL link to set up a Hypertext Transfer Protocol Secure (HTTPS) session by the mobile payment device;
downloading a program script and validation token to the mobile device in the HTTPS session; and
confirming payment transaction by the mobile payment device, the step of confirming payment transaction includes the program script retrieving the payment related information embedded in the URL, interacting with a mobile payment core of the mobile device to generate encrypted payment data and sending the encrypted data to one of the online merchant and the server.

2. A mobile payment method as claimed in claim 1 wherein the step of providing transaction information for a transaction includes the step of making a purchase at an online merchant and checking out using a web browsing capable device.

3. A mobile payment method as claimed in claim 2 wherein the step of sending the transaction information to a server includes sending the transaction information to the server from one of the online merchant and the web browsing capable device.

4. A mobile payment method as claimed in claim 1 wherein the step of providing transaction information for a transaction includes the steps of creating a bill for goods or services by a provider of the goods or services, the bill including transaction information.

5. A mobile payment method as claimed in claim 4 wherein the step of sending the transaction information to a server includes sending the transaction information to the server from the provider of the goods or services.

6. A mobile payment method as claimed in claim 1 wherein the step of preparing a URL link containing the transaction information includes information required by a mobile wallet Application Programming Interface (API) used in the transaction.

7. A mobile payment method as claimed in claim 1 wherein the step of sending the URL link to the mobile payment device using the mobile identity includes using one of Short Message Service (SMS) and Email.

8. A mobile payment method as claimed in claim 3 wherein the step of the user clicking on the URL link to set up a HTTPS session includes setting up a session between the mobile payment device and one of the online merchant and the server.

9. A mobile payment method as claimed in claim 1 wherein the step of downloading a program script and validation token to the mobile device in the HTTPS session includes downloading the program script and the validation token from one of the online merchant and the server.

10. A mobile payment method comprising the steps of:
providing a web browsing capable device;
providing a mobile payment device having mobile payment capability and a mobile identity;
providing a server connectable to the web browsing capable device and the mobile payment device, the server including a Uniform Resource Locator (URL) Generation module;
using the web browsing capable device in communication with the Internet to make an online purchase at an online store and receiving payment information;
sending transaction information from one of the online merchant and the web browsing capable device to the URL Generation module of the server;
the URL Generation module of the server creating a URL link containing the transaction information, the transaction information including a transaction identity, a transaction amount, a currency code, a merchant identity, supported networks and a message signature;
the server sending the URL link to the mobile payment device using the mobile identity;
displaying a URL link by the mobile payment device;
a user clicking on the URL link by the mobile payment device to set up a Hypertext Transfer Protocol Secure (HTTPS) session between the mobile payment device and one of the server and the online merchant;
downloading a program script and validation token to the mobile payment device from the one of the server and the online merchant in the HTTPS session;
sending a token indication from the mobile device to one of the server and the online merchant; and
one of the server and the online merchant authorizing the transaction with a payment network.

11. A mobile payment method as claimed in claim 10 wherein the step of preparing a URL link containing the transaction information includes information required by a mobile wallet Application Programming Interface (API) used in the transaction.

12. A mobile payment method as claimed in claim 10 wherein the step of sending the URL link to the mobile payment device using the mobile identity includes using one of Short Message Service (SMS) and Email.

13. A mobile payment system comprising:
- a server receiving transaction information, the server including a Uniform Resource Locator (URL) link generator for creating a URL link including the transaction information, the transaction information including a transaction identity, a transaction amount, a currency code, a merchant identity, supported networks and a message signature;
- a mobile payment device having a mobile payment capability;
- wherein the mobile payment device receives the URL link with the transaction information, displays the URL link on the mobile payment device for selection by a user, and establishes a Hypertext Transfer Protocol Secure (HTTPS) session using the URL link when selected by the user; and program script and validation token are downloaded to the mobile payment device in the HTTPS session, wherein the program script retrieves the payment information embedded in the URL, establishes a payment protocol with the payment capability of the mobile payment device.

14. A mobile payment system as claimed in claim 13 further including:
- an online merchant; and
- a web browsing capable device communicating with the online merchant to create the transaction information and send the transaction information to the server.

15. A mobile payment system as claimed in claim 13 further including an online merchant to create the transaction information and send the transaction information to the server.

16. A mobile payment system as claimed in claim 13 further including a mobile payment core of the mobile payment device interacting with the program script to generate encrypted payment data sent to the server.

* * * * *